(12) United States Patent
Jin

(10) Patent No.: US 10,309,122 B2
(45) Date of Patent: Jun. 4, 2019

(54) TENT AND TENT SUPPORT FRAME HAVING SUPPORT POLES COUPLED BY ROTATABLE CONNECTOR

(71) Applicant: Xiamen Innovation Metal Products Co. Ltd., Xiamen (CN)

(72) Inventor: Ju Young Jin, Xiamen (CN)

(73) Assignee: Xiamen Innovation Metal Products Co., Ltd., Xiamen (CN)

( * ) Notice: Subject to any disclaimer, the term of this patent is extended or adjusted under 35 U.S.C. 154(b) by 0 days.

(21) Appl. No.: 15/374,214

(22) Filed: Dec. 9, 2016

(65) Prior Publication Data

US 2017/0167159 A1 Jun. 15, 2017

(30) Foreign Application Priority Data

Dec. 10, 2015 (CN) .................... 2015 2 1021910 U

(51) Int. Cl.
*E04H 15/42* (2006.01)
*F16B 7/04* (2006.01)
(Continued)

(52) U.S. Cl.
CPC ............ *E04H 15/60* (2013.01); *E04H 15/36* (2013.01); *E04H 15/405* (2013.01); *E04H 15/42* (2013.01);
(Continued)

(58) Field of Classification Search
CPC ......... E04H 15/48; E04H 15/32; E04H 15/44; E04H 15/36; E04H 15/60; E04H 15/405;
(Continued)

(56) References Cited

U.S. PATENT DOCUMENTS

RE28,067 E * 7/1974 Hyman .................... A45B 7/00
135/114
4,037,978 A * 7/1977 Connelly ................. F16B 7/04
403/164
(Continued)

FOREIGN PATENT DOCUMENTS

| KR | 20-0250665 | * | 11/2001 | ............. E04H 15/32 |
| KR | 20-0304799 | * | 2/2003 | ............. E04H 15/44 |
| KR | 20110002454 U | * | 3/2011 | ............. E04H 15/32 |
| KR | 101154851 B1 | * | 6/2012 | ............. E04H 15/32 |
| KR | 101161621 B1 | * | 7/2012 | ............. E04H 15/34 |

OTHER PUBLICATIONS

An English Bibliographic data for KR Patent No. 10-1161621). (Year: 2012).*

*Primary Examiner* — Winnie Yip
(74) *Attorney, Agent, or Firm* — Morgan, Lewis & Bockius LLP

(57) ABSTRACT

Disclosed are tents and tent support frames. A tent support frame includes a rotatable connector and tent support poles. The rotatable connector includes first and second connectors configured to be coupled in a vertical direction with one above another, and rotatable with respect to each other. The first connector includes a first through-hole in a horizontal direction, and the second connector includes a second through-hole in the horizontal direction. Tent support poles include a first tent support pole configured to pass through the first through-hole of the first connector, and a second tent support pole configured to pass through the second through-hole of the second connector.

12 Claims, 9 Drawing Sheets

(51) Int. Cl.
*E04H 15/60* (2006.01)
*E04H 15/36* (2006.01)
*E04H 15/40* (2006.01)
*E04H 15/48* (2006.01)
*E04H 15/32* (2006.01)
*F16B 21/07* (2006.01)
*F16B 21/16* (2006.01)

(52) U.S. Cl.
CPC .......... *E04H 15/425* (2013.01); *E04H 15/48* (2013.01); *F16B 7/044* (2013.01); *E04H 2015/326* (2013.01); *F16B 7/0493* (2013.01); *F16B 21/073* (2013.01); *F16B 21/16* (2013.01)

(58) Field of Classification Search
CPC ...... E04H 15/425; F16B 7/044; F16B 7/0493; F16B 7/04
USPC .... 135/120, 135–136, 147, 152, 156, 120.3, 135/114, 906, 121; 403/170, 346, 355, 403/400
See application file for complete search history.

(56) References Cited

U.S. PATENT DOCUMENTS

| | | | | |
|---|---|---|---|---|
| 5,333,634 A * | 8/1994 | Taylor | ..................... | E04H 15/28 135/118 |
| 6,286,531 B1 * | 9/2001 | Joo-Tai | ................... | E04H 15/40 135/114 |
| 6,557,572 B2 * | 5/2003 | Lah | ......................... | E04H 15/48 135/114 |
| 7,766,023 B2 * | 8/2010 | Scherer | .................. | E04H 15/42 135/120.3 |
| 7,810,514 B2 * | 10/2010 | Lah | ......................... | E04H 15/60 135/120.1 |
| 8,991,667 B2 * | 3/2015 | Perez | ....................... | A45F 4/04 135/137 |
| 9,260,881 B2 * | 2/2016 | Lamke | .................... | E04H 15/36 |
| 2009/0173369 A1 * | 7/2009 | Lah | ....................... | E04H 15/425 135/121 |
| 2014/0076372 A1 * | 3/2014 | Jin | ......................... | E04H 15/46 135/139 |
| 2016/0290001 A1 * | 10/2016 | Choi | ...................... | E04H 15/48 |

\* cited by examiner

TENT AND TENT SUPPORT FRAME HAVING SUPPORT POLES COUPLED BY ROTATABLE CONNECTOR

CROSS-REFERENCE TO RELATED APPLICATION

The present application claims priority of Chinese Patent Application Number 201521021910.4 filed Dec. 10, 2015, the entire contents of which application are incorporated herein for all purposes by this reference.

FIELD OF THE INVENTION

The present invention generally relates to tents and tent support frames, and more particularly, to tents and tent support frames including tent support poles coupled by rotatable connectors.

BACKGROUND

Nowadays, people like outdoor activities and often go out on weekends or holidays. Consequently, there is an increasingly high demand for outdoor gear such as tents. There are mainly two types of tents available on the market. One type of tents is assemblable. This type of tents has supports formed by sets of poles connected to each other. The supports are independent and separated from each other. As such, the setting up of the tent is time-consuming and physically demanding. Moreover, through-holes for inserting the supports to set up the tent have to be sewn. The independent and separate supports also make the setting up of the tent difficult and make the tent unstable. The other type of tents is foldable. Main issues with the current foldable tents include their high manufacturing costs and large size when folded. To realize the integrated folding/unfolding of the tent support and the tent, structural parts, such as connectors and extensible members, need to be added to the tent support, and the tent support and the tent fabric need to be assembled in advance. This significantly increases material cost and labor cost. In addition, the structural parts for realizing the integrated folding/unfolding and connection of the tent supports increase the size of the tent when folded.

Given the above background, there is a need in the art for tent support frames and tents that address the above-mentioned problems.

The information disclosed in this Background section is provided for an understanding of the general background of the invention and is not an acknowledgement or suggestion that this information forms part of the prior art already known to a person skilled in the art.

SUMMARY

Various embodiments of the present invention provide tent support frames. In some embodiments, a tent support frame includes a rotatable connector and tent support poles. The rotatable connector includes a first connector and a second connector configured to be coupled in a vertical direction with one above another, and rotatable with respect to each other. The first connector includes a first through-hole in a horizontal direction, and the second connector includes a second through-hole in the horizontal direction. Tent support poles include a first tent support pole configured to pass through the first through-hole of the first connector, and a second tent support pole configured to pass through the second through-hole of the second connector.

In some embodiments, the first connector includes a third through-hole in the vertical direction, and the second connector includes a fourth through-hole in the vertical direction, wherein the first and second connectors are coupled via the third through-hole and the fourth through-hole by a nut and a bolt. In an embodiment, the first connector includes a boss, and the second connector includes a recess configured to engage with the boss of the first connector.

In some embodiments, the first connector includes a ring-shaped groove in the horizontal direction, and the second connector includes a connection member to engage with the ring-shaped groove of the first connector. In an embodiment, the connection member includes one or more circumferentially disposed snap joints. In an embodiment, the connection member includes a pair of snap joints positioned symmetrically with respect to each other.

In some embodiments, the first support pole, the second support pole, or each of the first and second tent support poles includes one or more connection sleeves, a plurality of hollow poles, and an elastic rope. Two adjacent hollow poles are coupled to each other by a corresponding connection sleeve. The elastic rope is disposed inside of the plurality of hollow poles when assembled, and having each end connected to a corresponding hollow pole at a corresponding end of the tent support pole. In an embodiment, one or each connection sleeve includes a tapered or flared opening at one or each end of the connection sleeve, facilitating insertion of a corresponding hollow pole. In an embodiment, one or each connection sleeve includes a bump at the middle portion of the connection sleeve and protruding inwardly to prevent the hollow poles from passing through the connection sleeve when connecting the hollow poles to make the tent support pole.

Various other embodiments of the present invention provide tents. In some embodiments, a tent includes a tent support frame disclosed herein, a tent fabric, and a plurality of pole hooks connecting the tent fabric to the tent support frame.

The systems and methods of the present invention have other features and advantages that will be apparent from or are set forth in more detail in the accompanying drawings, which are incorporated herein, and the following Detailed Description, which together serve to explain certain principles of the present invention.

BRIEF DESCRIPTION OF THE DRAWINGS

The accompanying drawings, which are incorporated into and constitute a part of this specification, illustrate one or more embodiments of the present application and, together with the detailed description, serve to explain the principles and implementations of the application.

DETAILED DESCRIPTION

Reference will now be made in detail to implementations of the present invention as illustrated in the accompanying drawings. The same reference indicators will be used throughout the drawings and the following detailed description to refer to the same or like parts. Those of ordinary skill in the art will realize that the following detailed description of the present invention is illustrative only and is not intended to be in any way limiting. Other embodiments of the present invention will readily suggest themselves to such skilled persons having benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

Embodiments of the present invention are described in the context of a tent support frame and a tent having the tent support frame. A tent support frame generally includes a plurality of tent support poles coupled to each other, for example, by a rotatable connector. In various embodiments, the rotatable connector is disposed in the middle or middle portion of the tent support poles. In some embodiments, the rotatable connector includes stacked connectors with one on top of another (e.g., when the tent support frame is assembled) and rotatable relative to each other.

Figure 1:
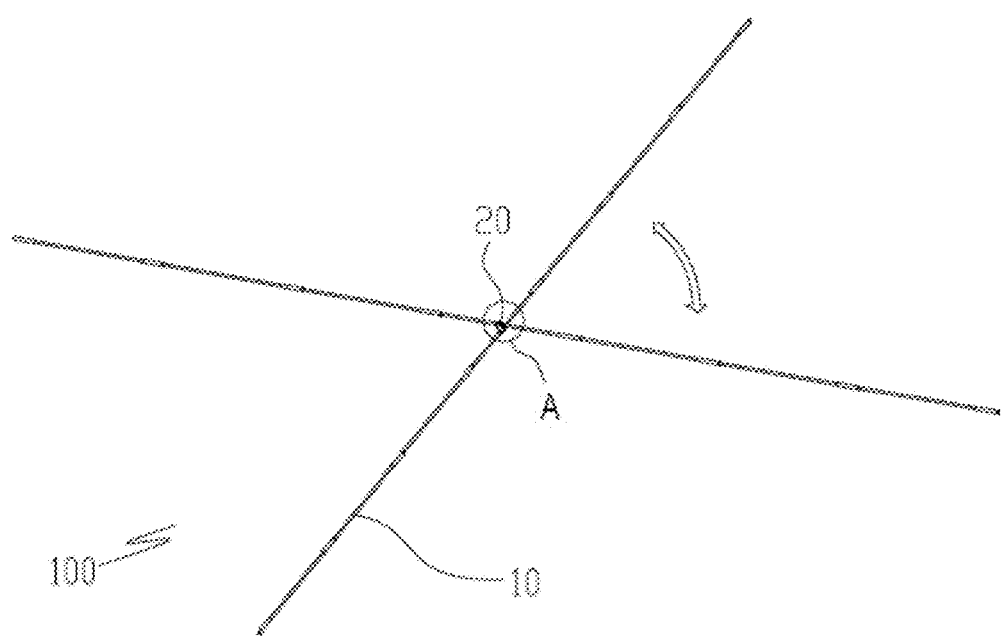
FIG. 1 is a schematic diagram of a tent support frame according to some embodiments of the present invention.
Figure 2:
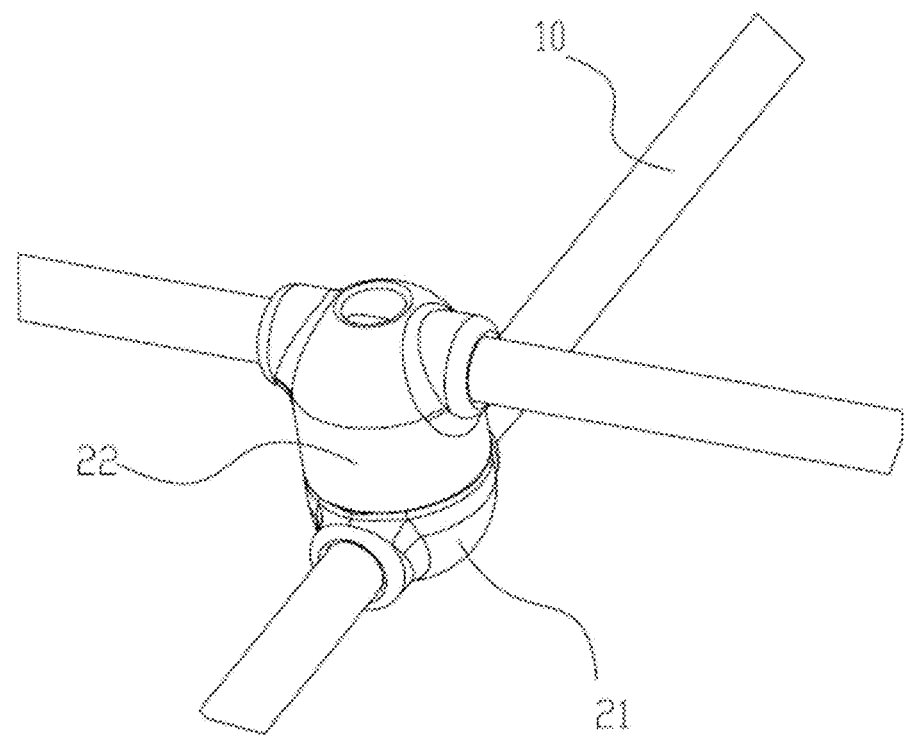
FIG. 2 is an enlarged view along circle A of FIG. 1.

By way of example, FIGS. 1 and 2 illustrate tent support frame 100 comprising a pair of tent support poles 10 coupled by rotatable connector 20. Rotatable connector 20 includes first connector 21 and second connector 22 arranged in a vertical direction and rotatable relative to each other in a horizontal direction as shown in FIG. 2. In some embodiments, such as those illustrated in FIGS. 4-10, first connector 21 includes a first through-hole 211 in a horizontal direction for insert connection of a first tent support pole, and second connector 22 includes a second through-hole 221 in a horizontal direction for insert connection of a second tent support pole. As used herein, the terms "vertical" or "horizontal", and etc. are used to describe features of the exemplary embodiments with reference to the positions of such features as displayed in the figures.

The rotatable connector can be configured in a variety of ways to implement the connection between the first connector and the second connector. Disclosed herein are two embodiments. It should be understood that these embodiments are illustrative only and are not intended to be in any way limiting.

Figure 4:
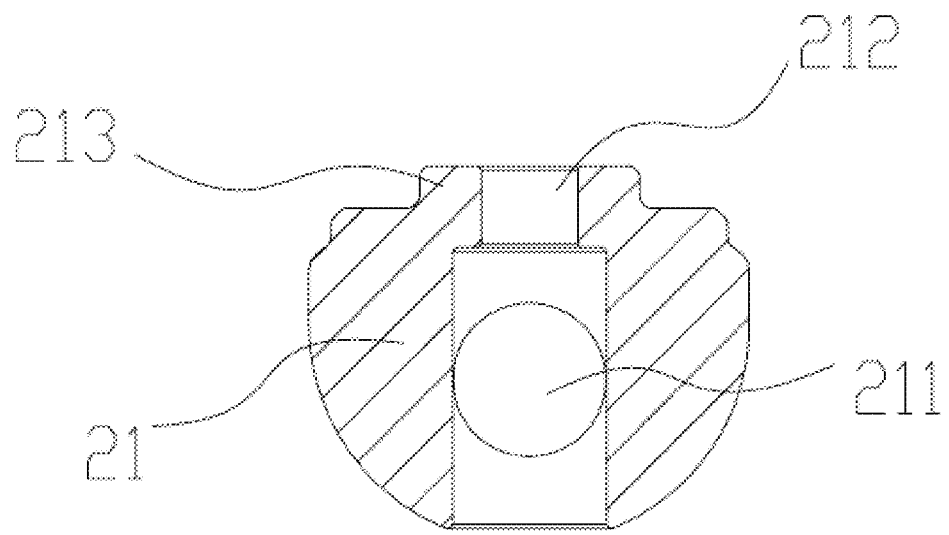
FIG. 4 is a cross-sectional view illustrating a first connector according to a first embodiment of the present invention.
Figure 5:
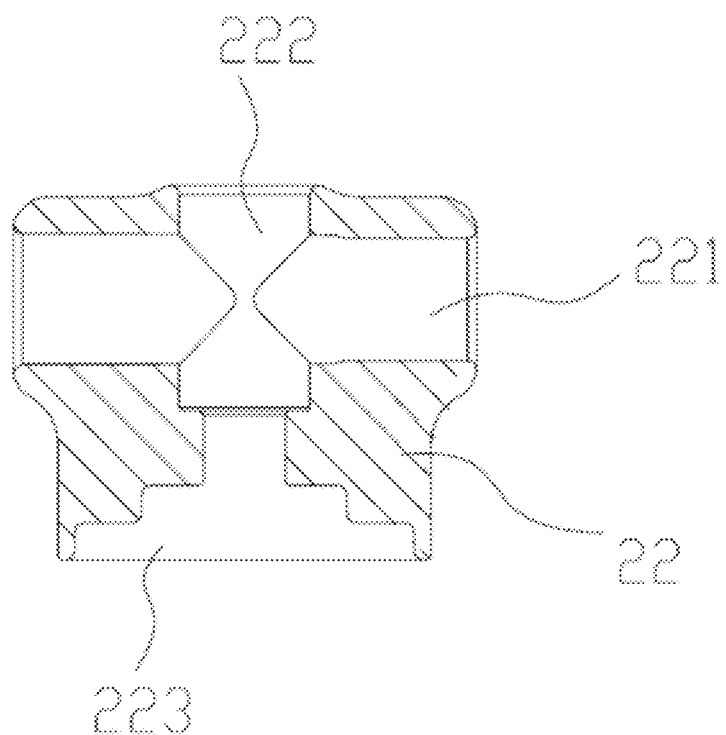
FIG. 5 is a cross-sectional view illustrating a second connector according to a first embodiment of the present invention.
Figure 6:
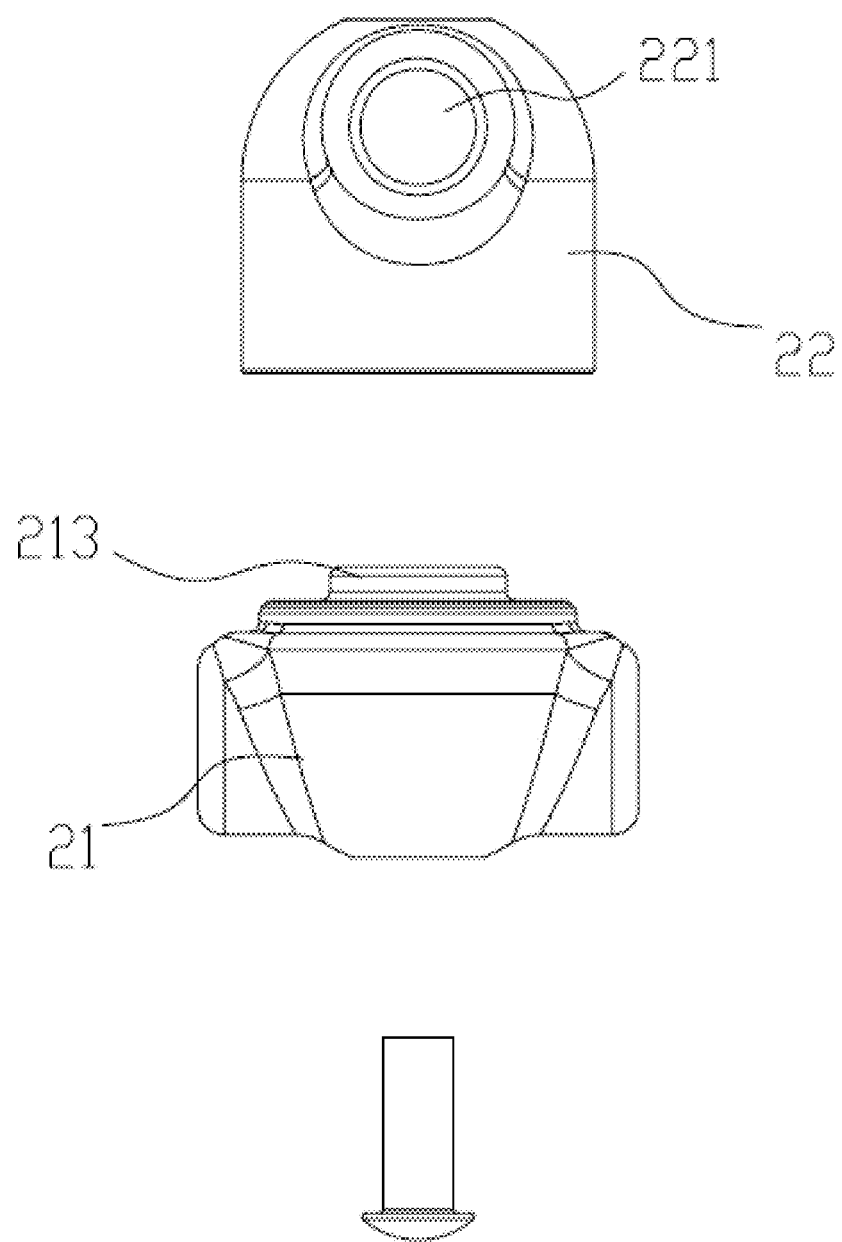
FIG. 6 is a schematic diagram illustrating disengaged first and second connectors according to a first embodiment of the present invention.

Referring to FIGS. 4-6, there is depicted a rotatable connector in accordance with the first embodiment of the present invention. In the illustrated embodiment, first connector 21 includes a hole such as third through-hole 212 in the vertical direction, and second connector 22 includes a hole such as fourth through-hole 222 in the vertical direction. The first and second connectors are to be connected to each other by fasteners, such as a bolt and a nut, through third through-hole 212 and fourth through-hole 222. The connection is not a deadlock, but instead allows first connector 21 and second connector 22 to rotate relative to each other.

In some embodiments, first connector 21 includes a boss such as boss 213 thereon, and second connector 22 includes a recess such as recess 223. Recess 223 engages with boss 213, assisting in aligning the first and second connectors and thus making assembling the rotatable connector simple, easy and quick.

Figure 7:
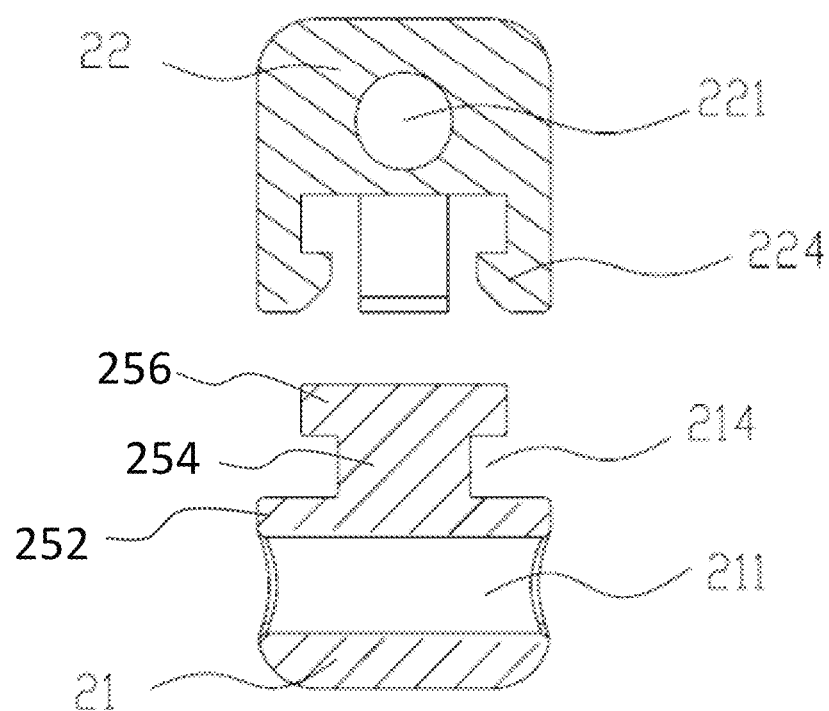
FIG. 7 is a cross-sectional view illustrating disengaged first and second connectors according to a second embodiment of the present invention.
Figure 8:
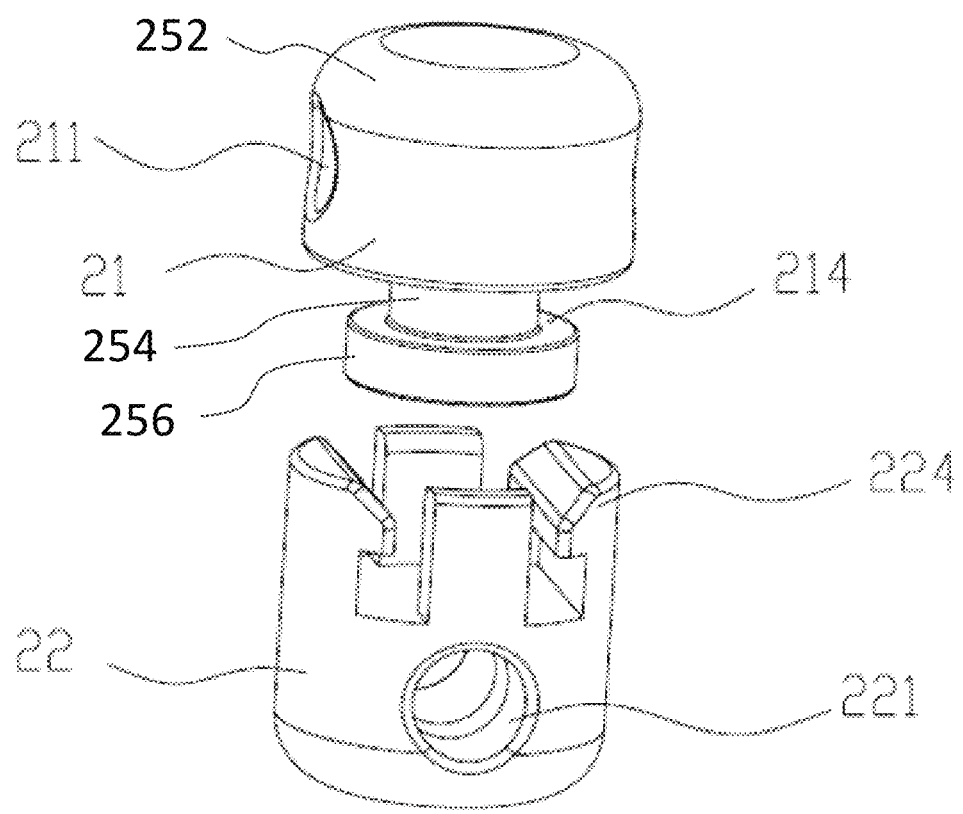
FIG. 8 is a perspective view illustrating disengaged first and second connectors according to a second embodiment of the present invention.
Figure 9:
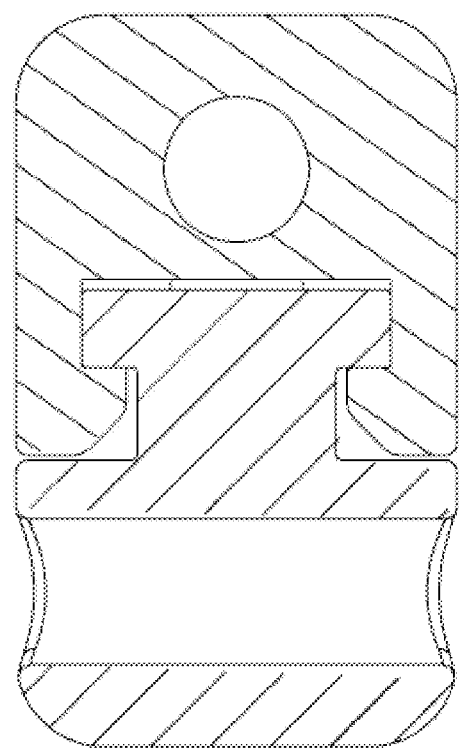
FIG. 9 is a cross-sectional view illustrating engaged first and second connectors according to a second embodiment of the present invention.
Figure 10:
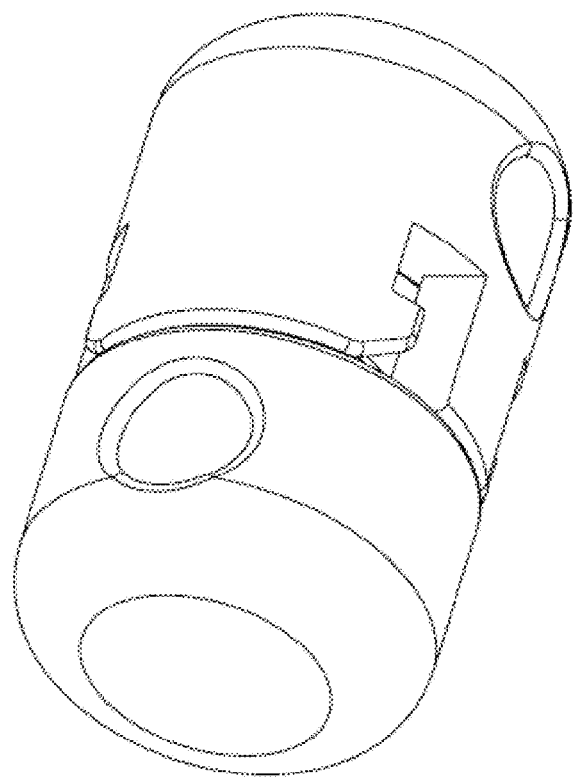
FIG. 10 is a perspective view illustrating engaged first and second connectors according to a second embodiment of the present invention.

Referring to FIGS. 7-10, there is depicted a rotatable connector in accordance with the second embodiment of the present invention. In the illustrated embodiment, first connector 21 includes body segment 252, head segment 256, and neck segment 254 in between. First through-hole 211 is formed at body segment 252. Neck segment 254 is recessed inwardly with respect to body segment 252 and head segment 256, thereby forming a circumferentially-continuous groove such as ring-shaped groove 214 in the horizontal direction. Second connector 22 includes a connection member such as connection member 224. In an embodiment, connection member 224 includes one or more circumferentially disposed snap joints, which in some cases are cantilever or L-shaped. For example, FIGS. 7 and 8 illustrate a pair of snap joints disposed circumferentially and positioned symmetrically with respect to each other. Connection member 224 couples (e.g., snap fits) with ring-shaped groove 214. In some embodiments, connection member 224 is made of an elastic material, such as rubber. Assembling the rotatable connector is easy and quick. It can be done by simply pushing first connector 21 into second connector 22 to engage ring-shaped groove 214 of first connector 21 with connection member 224 of second connector 22.

Figure 3:
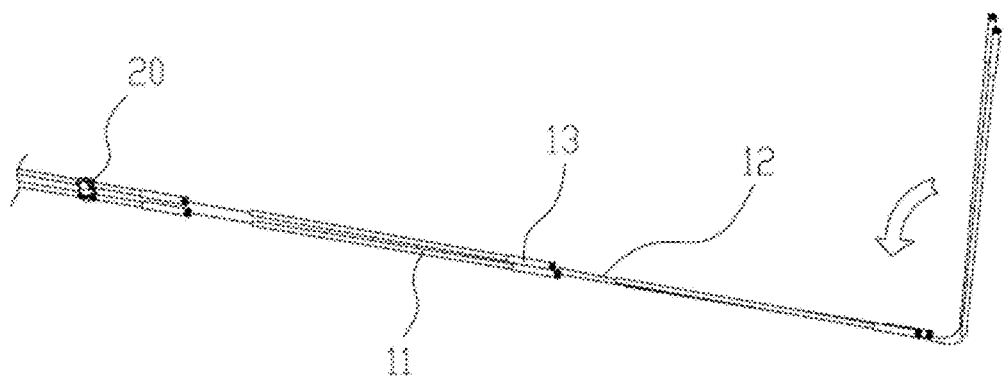
FIG. 3 is a schematic diagram of a partially folded tent support frame according to some embodiments of the present invention.
Figure 11:
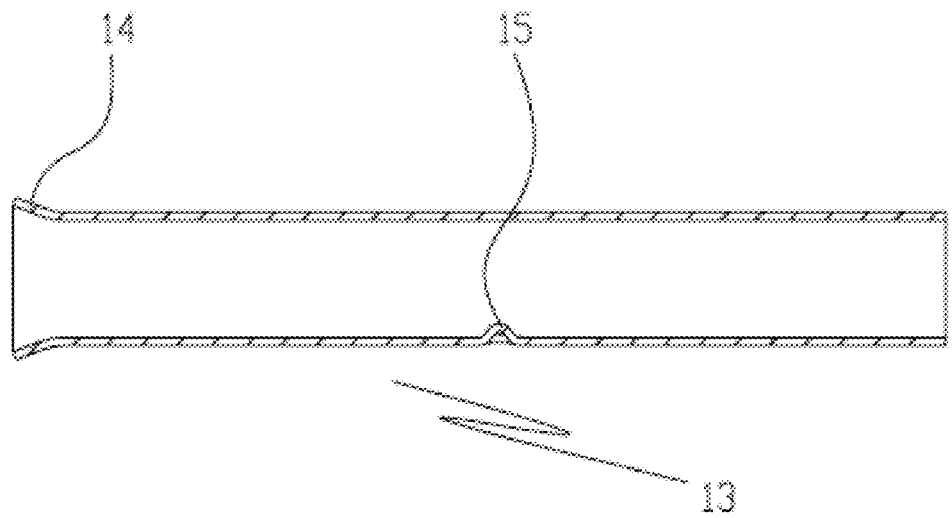
FIG. 11 is a cross-sectional view illustrating a connection sleeve according to some embodiments of the present invention.

Referring to FIGS. 3 and 11, in an exemplary embodiment of the present invention, tent support pole 10 comprises a plurality of hollow poles 11, elastic rope 12 (including cord, string, or the like), and one or more connection sleeves 13. Two adjacent hollow poles 11 are coupled to each other by a corresponding connection sleeve. Elastic rope 12 is disposed inside tent support pole 10 (e.g., inside the hollow poles) when assembled, and each end of elastic rope 12 is connected to a hollow pole at the corresponding end of the tent support pole.

In some embodiments, connection sleeve 13 includes tapered or flared opening 14 at one or each end of the connection sleeve. Tapered or flared opening 14 reduces the time for assembling the tent support pole, increases efficiency, and makes the assembling of the tent support pole easy and quick. In some embodiments, connection sleeve 13 includes bump 15 (e.g., protrusion, bent or the like) at the middle portion of the connection sleeve. Bump 15 protrudes inwardly, e.g., toward the axis line of the connection sleeve. Bump 15 sets the limit or boundary for the two adjacent hollow poles and prevents them from passing through the connection sleeve when assembling the hollow poles to make the tent support pole.

Figure 12:
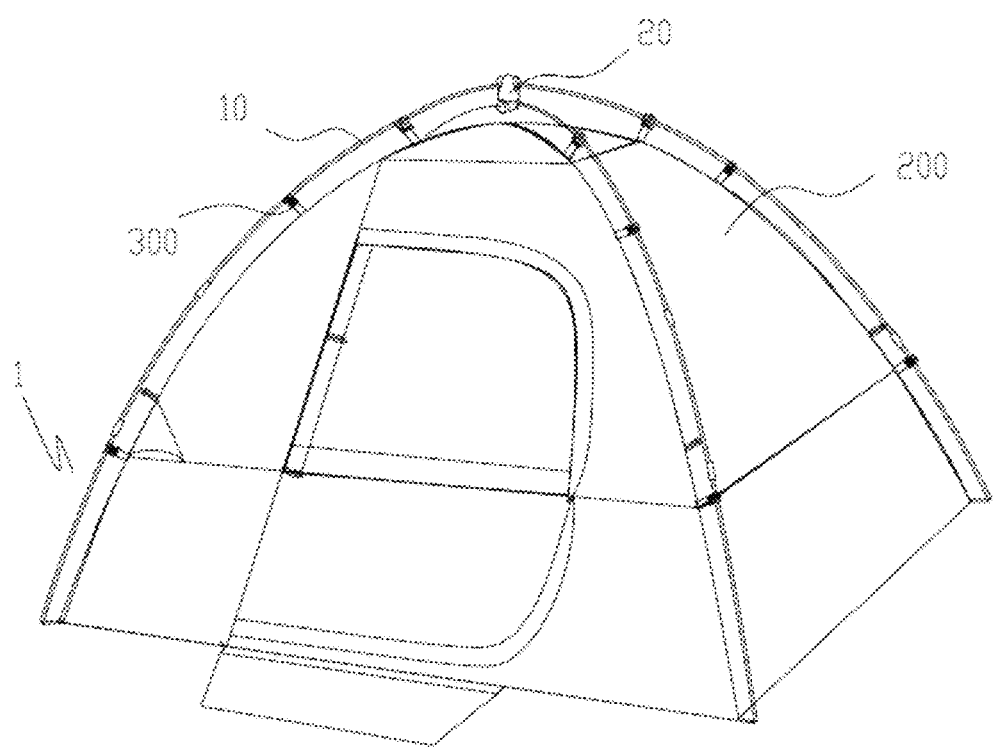
FIG. 12 is a schematic diagram illustrating a tent according to some embodiments of the present invention.

Referring to FIG. 12, there is depicted a tent in accordance with some embodiments of the present invention. As shown, tent 1 includes a tent support frame such as tent support frame 100 disclosed herein, a tent fabric such as tent fabric 200, and hooks such as pole hooks 300 connecting tent fabric 200 to tent support frame 100.

Tent support frames and tents of the present invention have several advantages. For example, tent support poles are coupled to each other by a rotatable rotatable connector, which in various cases are disposed at the middle or middle portion of the tent support poles. By using the rotatable connector, the tent is easy and quick to assemble or disassemble. By using the rotatable connector and/or the bumps of the connection sleeves, the connection sleeves are held in place after the tent is setup, thereby enhancing the stability of the tent. In addition, tapered or flared openings of the connection sleeves allow quick and easy assembling of tent support poles.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that, although the terms "first," "second," etc. may be used herein to describe various elements, these elements should not be limited by these terms. These terms are only used to distinguish one element from another. For example, a first connector could be termed a second connector, and, similarly, a second connector could be termed a first connector, without changing the meaning of the description, so long as all occurrences of the "first connector" are renamed consistently and all occurrences of the "second connector" are renamed consistently.

What is claimed is:

1. A tent support frame, comprising:
a rotatable connector comprising a first connector and a second connector, wherein
the first and second connectors are configured to be coupled in a vertical direction with one above another, and rotatable with respect to each other;
the first connector comprises a body segment, a head segment, and a neck segment in between, wherein a first through-hole is formed at the body segment, and wherein the neck segment is recessed inwardly with respect to the body segment and the head segment, thereby forming a circumferentially-continuous ring-shaped groove in a horizontal direction; and
the second connector comprises a segment formed with a second through-hole in the horizontal direction, and a plurality of connection members to snap-fit with the ring-shaped groove of the first connector, wherein each respective connection member in the plurality of connection members is extended from the segment along the vertical direction and spaced circumferentially apart from a corresponding adjacent connecting member in the plurality of connection members such that the segment and the plurality of connection members collectively form a substantially cylindrical shape; and
tent support poles comprising a first tent support pole configured to pass through the first through-hole of the first connector, and a second tent support pole configured to pass through the second through-hole of the second connector.

2. The tent support frame of claim 1, wherein the plurality of connection members comprises one or more circumferentially disposed snap joints.

3. The tent support frame of claim 1, wherein the plurality of connection members comprises a pair of snap joints positioned symmetrically with respect to each other.

4. The tent support frame of claim 1, wherein the first support pole, the second support pole, or each of the first and second tent support poles comprises:
one or more connection sleeves;
a plurality of hollow poles, wherein two adjacent hollow poles are coupled to each other by a corresponding connection sleeve; and
an elastic rope disposed inside of the plurality of hollow poles when assembled, and having each end connected to a corresponding hollow pole at a corresponding end of the tent support pole.

5. The tent support frame of claim 4, wherein one or each connection sleeve comprises a tapered or flared opening at one or each end of the connection sleeve, facilitating insertion of a corresponding hollow pole.

6. The tent support frame of claim 4, wherein one or each connection sleeve comprises a bump at a middle portion of the connection sleeve and protruding inwardly to prevent the hollow poles from passing through the connection sleeve when connecting the hollow poles to make the tent support pole.

7. A tent, comprising:
a tent support frame of claim 1;
a tent fabric; and
a plurality of pole hooks connecting the tent fabric to the tent support frame.

8. The tent of claim 7, wherein the plurality of connection members comprises one or more circumferentially disposed snap joints.

9. The tent of claim 7, wherein the plurality of connection members comprises a pair of snap joints positioned symmetrically with respect to each other.

10. The tent of claim 7, wherein the first support pole, the second support pole, or each of the first and second tent support poles comprises:
one or more connection sleeves;
a plurality of hollow poles, wherein two adjacent hollow poles are coupled to each other by a corresponding connection sleeve; and
an elastic rope disposed inside of the plurality of hollow poles when assembled, and having each end connected to a corresponding hollow pole at a corresponding end of the tent support pole.

11. The tent of claim 10, wherein one or each connection sleeve comprises a tapered or flared opening at one or each end of the connection sleeve, facilitating insertion of a corresponding hollow pole.

12. The tent of claim 10, wherein one or each connection sleeve comprises a bump at a middle portion of the connection sleeve and protruding inwardly to prevent the hollow poles from passing through the connection sleeve when connecting the hollow poles to make the tent support pole.

\* \* \* \* \*